July 22, 1947.  E. FRISCH  2,424,310
ELECTRIC PROPULSION SYSTEM
Filed Nov. 16, 1944
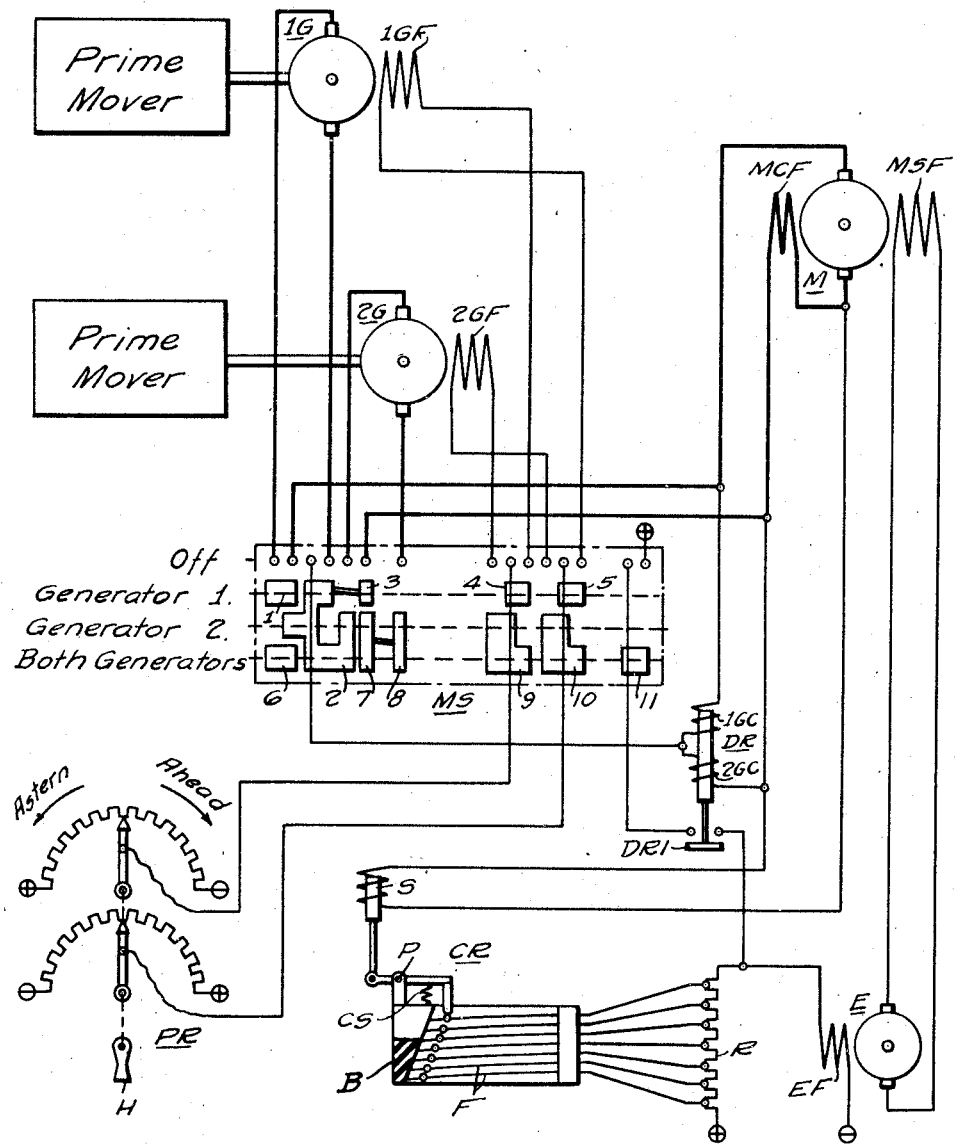
WITNESSES:
INVENTOR
Erling Frisch.
BY
ATTORNEY Patented July 22, 1947

2,424,310

UNITED STATES PATENT OFFICE 2,424,310

ELECTRIC PROPULSION SYSTEM

Erling Frisch, Pittsburgh, Pa., assignor to Westinghouse Electric Corporation, East Pittsburgh, Pa., a corporation of Pennsylvania Application November 16, 1944, Serial No. 563,733

5 Claims. (Cl. 172—239)

This invention relates generally to electric drives for ships and more particularly to an electric drive which embodies a motor for driving a ship's propeller and a plurality of reciprocating engine driven generators for supplying electrical energy to the motor.

Many small and medium size vessels are provided with drives of the character mentioned. Specifically such drives usually include two shunt wound direct current generators each driven by a Diesel engine and a shunt wound propeller motor. Ordinarily the generator and motor armatures are connected in series circuit relationship and provision is made for selectively connecting either or both of the generators to the motor. The field current of the generator can be varied from zero to a maximum value in either direction to conveniently effect speed control and reversing of the motor and the field current of the motor is usually maintained at a constant value over the whole speed range.

The motor speed may be controlled over a low speed range by increasing the generator field current in a selected direction from zero to a maximum while the Diesel engines are maintained at idling speed. Thereafter higher motor speeds are obtained by increasing the speed of the Diesel engines from idling speed to their maximum speed while the generator excitation is constant. The idling speed may, for example, be about 25% to 30% of maximum speed. By maintaining the motor field constant in its excitation a motor speed substantially proportional to the engine speed is had.

For vessels which must operate over a wide range of speeds the problem of efficient operation over the speed range is given serious consideration. The power expended in driving a vessel varies as the cube of its speed. Thus in a ship drive of the character referred to in which the engine speed controls the vessel speed over most of the range of speeds, the power absorbed by the motor at low speeds will be but a small percentage of the available engine power at the particular engine speed. More specifically at 50% of rated engine speed, the possible output of the engine is reduced to 50% assuming constant engine torque while the motor at this speed will absorb substantially only 12½% of rated engine power. To utilize to fullest advantage the available engine power, the motor field excitation can be decreased to thus tend to increase the motor speed and, hence, the required power.

Motor field control designed to maintain practically constant motor armature current thus affords a convenient means for varying the power requirements of the motor to, in effect, match the curve of the available engine output. Thus comparing the constantly excited motor with the variably excited motor on the basis of the previously made assumptions, it readily becomes apparent that a higher propeller speed at the point of 50% available engine power is obtained with variable motor excitation than with constant motor excitation; as a consequence, a proportionally greater vessel speed is obtained. Stated another way, and assuming 100% efficiency of the electric drive for convenience, it would theoretically be possible with variable motor field control to operate the propeller motor, with the engines running at 12½% of rated speed, at a speed equal to that of the constantly excited propeller motor with the engines at 50% of rated speed. This is an advantage since the engines should always be run at a minimum speed to keep engine wear to a minimum. This invention provides means for varying the motor field strength in such a manner as to maintain a fairly constant motor armature current at least over the range of speeds controlled by the engine speed. Thus the electrical power loading of the generator and as follows, the mechanical power loading of the engine driving the generator may be maintained at efficient levels over the speed range of the vessel.

If, when both generators are electrically connected to the motor, one of the engines driving a generator should stall, the other engine generator combination will continue to supply electrical power to the motor and current will continue to flow through the stalled generator in the same direction as previously. Since under these conditions the stalled generator normally remains energized, a motor torque will be developed in the stalled generator tending to drive it in a reversed rotational direction. If the value of the torque thus developed exceeds the static load of the engine, engine reversal will result. This reversing of the drive may cause serious damage, hence, means must be provided to obviate such a condition.

For control systems wherein a constant motor field excitation is provided, the foregoing situation presents no serious problem. With stalling of one engine the applied motor armature voltage and consequently the motor speed is reduced to 50%. Since the power required by the motor drops as the cube of the speed, the required power will be 12½% of full speed power. The motor armature current at this 50% reduced voltage is roughly about 25% of its previous value. It has been found that this greatly reduced current develops insufficient motoring torque in the generator to overcome the total engine and generator static friction. For control systems as the present, however, the motor current will be maintained at approximately a constant value of sufficient magnitude to effect engine reversal. Thus suitable means must be provided to prevent engine reversal.

A broad object of this invention is to provide an electric drive of the character mentioned which efficiently utilizes available engine power and provides adequate protection against engine reversal in the event such engine should stall.

A more specific object of this invention is to provide an electric drive of the character mentioned in which the motor armature currents are maintained substantially constant by varying the motor field excitation and which includes provisions for increasing the motor field strength to a predetermined maximum value, upon stalling of one of the engines and failure of the electrical output of the connected generator.

Further separate and combined objects of this invention are to provide an electric drive having a motor the loading of which varies as the cube of its speed and a pair of generators driven, for example, by reciprocating engines which both may be electrically connected to the motor to effect operation thereof, which includes provisions for varying the excitation of the motor field winding depending upon slight variation in motor armature currents in a manner to maintain substantially constant motor armature currents, which utilizes the failure of electrical output of any one generator to indicate stalling of its connected driving engine and which thereafter measurably increases the motor field excitation to minimize the motor armature currents.

Other objects and advantages will become apparent from a study of the following specification when considered in conjunction with the accompanying drawing, in which:

The single figure thereof illustrates an electric drive embodying the principles of this invention.

The electric drive illustrated in the drawing comprises generally, a motor M which, for example, may be connected to a ship's propeller, a pair of generators IG and 2G, a master switch MS for selectively electrically connecting either or both of the generators to the motor armature and for other control connections, an exciter E for exciting the motor shunt field winding MSF, a current regulator CR controlled according to motor armature currents for controlling the exciter field EF in accordance therewith, a potentiometer rheostat PR for varying and reversing the generator field excitation, a differential relay DR having the identical coils IGC and 2GC thereof, differentially energized according to the respective generators IG and 2G, and, which when operated by energization of a single coil when both generators are connected to the motor and the output of one generator fails, establishes a connection at its contacts DRI for shunting the current regulator CR, and a source of unidirectional electrical energy for energizing various of the system elements, designated by the plus and minus signs enclosed in the circles.

The propeller motor M has its shunt or separately excited field winding MSF connected directly across the armature winding of the exciter E. This shunt field is, therefore, energized according to the exciter electrical output. The exciter may be driven by any suitable constant speed prime mover (not illustrated), for example, a direct current motor.

The number one and number two generators IG and 2G, respectively, are selectively connected or both connected to the motor through the master switch MS. This master switch has three positions designated Generator 1, Generator 2 and Both generators. In the Generator 1 position, the armatures of the generator IG and the motor are connected in a series loop through the contact segments 1, 2 and 3. The field winding IGF is connected to the potentiometer rheostat through the contact segments 4 and 5. In this master switch position the coil IGC of the differential relay is connected across the armature of the first generator by means of the contact segments 1 and 3. In the Generator 2 position of the master switch the armature of the generator 2G is connected in a series loop with the motor armature through the contact segments 2, 7 and 8. The field winding 2GF is connected to the potentiometer rheostat by the contact segments 9 and 10 and the coil 2GC of the differential relay is connected across the second generator armature by the segment 2. In the Both generators position of the master switch, the armatures of both generators are connected in a series loop with the motor armature. This circuit may be traced from the generator IG through the segment 6, the armature of the motor M, the commutating field winding MCF, the segments 7 and 8, the armature of the generator 2G, the contact segment 2 to the generator IG. The generator field windings IGF and 2GF are connected in parallel relationship and then to the potentiometer rheostat by the segments 9 and 10. Each coil IGC and 2GC is connected across its associated generator, respectively, by the segments 2 and 6 and the segments 2, 7 and 8. In this third and last position of the master switch, the conducting segment 11 completes a circuit in conjunction with the contacts DRI when closed which shunts the resistor R from the exciter field circuit to thus apply full excitation to the exciter field.

The current regulator CR comprises the resistor R which has connected along spaced taps thereof the flexible contact carrying conducting strips F. These strips are limited in their open contact position by a block B which has a sloping surface engaging the free contact carrying ends of the conducting strips. The contacts are progressively closed by means of a solenoid S, the coil of which is connected across the motor commutating field MCF and hence energized according to the motor armature currents. The core of this solenoid engages an arm pivoted at P which engages the first or uppermost flexible conductor. Movement of the arm to its inoperative position is effected by a compression spring CS. With this arrangement the core of the solenoid assumes a position within the coil in which the magnetic forces acting thereon are balanced by the cumulative mechanical forces of the compression spring CS and the flexible conductors F. Movement of the core upwardly in the coil actuates the pivoted arm clockwise to deflect the first flexible conductor which engages the second deflecting it to engage a third and so on, thus progressively shunting tapped portions of the resistor R, until magnetic and mechanical equilibrium is reached. It is thus apparent that the motor field strength is varied according to the motor armature current.

The potentiometer rheostat PR comprises two arcuate resistor sections which are oppositely energized and which each have a resistor slider connected to a common shaft to be simultaneously actuated by the handwheel or handle H. As shown in the drawing, equal resistor sections appear on the left and right-hand sides of the resistor sliders. Thus the currents flowing through the field windings from the opposite sides of the potentiometer rheostat are equal and opposed for the reason that the sliders as shown tap the midpoints of the voltage drops across the resistors. Hence the energizing potentials are equal and opposed. Movement of the sliders to either the right or left unbalances the applied voltages and produces an overbalancing current in one or the other direction.

The prime movers may each be any suitable variable speed machine. For the class of vessel to which the present drive is applied, however, the prime movers will probably be Diesel engines. The balance of this disclosure may be understood in this connection.

In operating the system the engines, if both generators are to be connected to the motor, are brought up to idling speed which as hereinbefore noted, may be about 25% to 30% of rated speed. With the potentiometer rheostat in the position shown, the master switch is moved to its Both generators position thus connecting the windings 1GF and 2GF in parallel with respect to the potentiometer rheostat, connecting the armature windings of the generator in a series loop with the motor armature winding and connecting the 1GC and 2GC differential relay coils across their respective generators. The contact segment 11 establishes a partial shunt circuit around the resistor R. If it is desired to operate the vessel in the Ahead direction, the potentiometer rheostate sliders are moved along the rheostat section so designated. This inserts resistance in one parallel energizing path while removing it from the other parallel path, namely the Ahead path through the potentiometer rheostat, and thus energizes the generator fields to operate the motor in the forward or Ahead direction. As the generator excitation is increased to its maximum by movement of the sliders in the Ahead direction to their limits of movement, the motor speed increases to the maximum value thus obtainable. At this fairly low speed, the power required to drive the propeller is quite low, thus even though the motor is set at weak field by the resistor R, the armature current may be insufficient to actuate the solenoid. Increasing the speeds of the prime movers increases the generator output even though now the generator excitation remains unchanged.

Since the motor field is weak, the motor armature current now tends to rise rapidly, the solenoid is actuated and a portion of the resistor R shunted sufficient to so control the exciter and as follows the motor shunt field that the motor speed may be held within a given limit such that the required power will not exceed that available at that selected engine speed. The armature currents thus control the motor such that the required power closely approaches but does not exceed the available power. In this manner, the motor may be accelerated to its maximum speed.

If during such operation of the electric drive, one of the reciprocating engines should for some reason stall, one of the coils of the differential relay will be deenergized; the flux produced by the energized coil is thus unopposed and the relay picks up closing its contacts DR1 to complete the shunt circuit around the resistor R. The field MSF is thus excited at some high value and as a result, the armature currents are reduced sufficiently to prevent operation of the stalled generator as a motor to reversely drive the engine.

If the engines and as a consequence the propeller motor are being operated at some high speed and it is desired to reduce the speed of the vessel, the engine or prime mover speed is reduced. The power input to the motor armature drops. This drop in power input however is primarily a voltage drop since, the current regulator with a slight drop in motor armature current immediately acts to insert resistance in the exciter field and thus weaken the motor field. This weakening of the motor field continues until stabilized operation of the motor obtains. Meanwhile, however, the torque loading of the engines driving the generators, in view of the substantially constant generator current, has remained unchanged.

Reversing of the propeller motor and consequently movement of the vessel in the astern direction is obtained by simply rotating the potentiometer rheostat in a counterclockwise direction to the full astern direction.

When the vessel is operating on one engine generator combination, the function of the DR relay is not needed. Under such operating conditions, however, only one of the two identical coils 1GC and 2GC is energized. Hence, the relay picks up and closes its contacts DR1. To avoid shunting the resistor R under these operating conditions, the conducting segment 11 is designed to close the shunt circuit only in the "Both generators" position of the master switch and maintain the shunt circuit open in the other two master switch positions, thus simply and conveniently rendering the operation of the DR relay ineffective to close the shunt circuit.

It is apparent that the disclosed electric drive is efficient and simple in its operation. The motor field control provided, simply and effectively maintains a substantially constant torque loading on the engines driving the generators and thereby effects utilization to the fullest advantage as is practicable the available engine power. At the same time to prevent engine reversal should one engine stall when both generators are connected to the motor, provision is made for strengthening the motor field sufficiently to effect a limitation of the currents in the series loop circuit such that the stalled generator may not be driven in a reverse direction as a motor.

The foregoing disclosure and the showings made in the drawing are merely illustrative of the principles of this invention and are not to be considered in a limiting sense. The only limitations are to be determined from the scope of the appended claims.

I claim as my invention:

1. In an electric drive, the combination of, a motor, a field winding for the motor, a plurality of generators electrically connected in series with the motor, means for supplying electrical energy to said motor field winding depending upon the magnitude of the motor armature current, control means, means for energizing said control means in dependence of the electrical output of all said generators, said energization being of a character to maintain said control means inactive when all said generators supply electrical energy thereto and rendering said control means active upon failure of energization thereof by any one of said generators, and means responsive to said control means for applying a predetermined maximum excitation to said motor field winding upon operation of said control means.

2. In an electric drive, the combination of, a motor, a field winding for the motor, a plurality of generators, means for selectively electrically connecting any one of, or all of said generators in series with said motor to energize said motor, means for supplying electrical energy to the motor field winding depending upon the motor armature current for controlling the excitation of said motor to maintain the motor armature current substantially constant, means operable when all said generators are connected to said motor, upon the failure of electrical output of any one of said generators for energizing said motor field winding according to a predetermined maximum electrical quantity, and means for rendering said last named means ineffective when any one of said generators is connected to said motor.

3. In an electric drive, the combination of, a motor, a field winding for the motor, a pair of generators, means for selectively electrically connecting either or both of said generators in series with said motor to energize said motor, means for generating an electrical quantity for energizing the field winding of said motor, means responsive to motor armature currents for controlling said means for generating an electrical quantity to effect energization of said motor field winding in a manner to maintain said motor armature currents substantially constant, an electromagnetic contacting device having a pair of differentially related coils energized according to the electrical output of each of said generators, said electromagnetic device being inoperative when both said coils are energized, contacting means operated by said electromagnetic device for shunting said means responsive to motor armature currents when only one coil of said electromagnetic device is energized, and means for rendering said electromagnetic device ineffective to shunt said means responsive to motor armature currents when only one of said generators is connected to said motor.

4. In an electric drive, the combination of, a motor having an armature winding and a field winding, a pair of generators each having an aramture winding, a controller for selectively electrically connecting either or both of the armature windings of said generators to the armature winding of said motor to energize said motor, an exciter having an armature winding and a field winding, circuit means electrically connecting the armature winding of said exciter to said field winding of said motor, a resistor in series with the exciter field winding, means for supplying electrical energy through said resistor to said field winding of said exciter, an electromagnetic regulator responsive to motor armature currents for progressively shunting portions of said resistor with increasing motor armature currents, an electromagnetic device having a pair of differentially connected coils each associated with one of said generators, said coils being energized according to the electrical output of the associated generator when such generator is connected to said motor, said electromagnetic device being inoperative when said coils are substantially equally energized, and operative when one of said coils is energized, contact means operated by said electromagnetic device, said contacting means upon operation of said electromagnetic device partially establishing a shunting circuit around said resistor, and contact means forming a part of said controller for completing said shunting circuit around said resistor only when both said generators are electrically connected to said motor.

5. In an electric drive, the combination of, a motor, a pair of generators, means for selectively electrically connecting either or both of said generators in series with said motor, means for varying and reversing the excitation of said generators to vary and reverse the electrical output thereof to effect reversing operation of said motor at varying speeds, means for varying the speed of operation of said generators to effect further variation in the electrical output thereof, means for controlling the excitation of said motor such that the electrical current supplied thereto is maintained substantially constant, and means differentially energized depending upon the electrical output of each of said generators and operable only when both said generators are electrically connected to said motor and upon failure of the electrical output of one of said generators to effect excitation of said motor at some predetermined maximum value.

ERLING FRISCH.

REFERENCES CITED

The following references are of record in the file of this patent:

UNITED STATES PATENTS

| Number | Name | Date |
|--------|------|------|
| 865,822 | Bogen | Sept. 10, 1907 |
| 1,652,504 | Thau | Dec. 13, 1927 |
| 1,870,092 | Byles | Aug. 2, 1932 |
| 2,301,689 | Edwards et al. | Nov. 10, 1942 |
| 2,315,637 | McShane | Apr. 6, 1943 |